United States Patent [19]

Jones et al.

[11] Patent Number: 4,981,018
[45] Date of Patent: Jan. 1, 1991

[54] COMPRESSOR SHROUD AIR BLEED PASSAGES

[75] Inventors: Anthony C. Jones; Colin Rodgers, both of San Diego, Calif.

[73] Assignee: Sundstrand Corporation, Rockford, Ill.

[21] Appl. No.: 354,015

[22] Filed: May 18, 1989

[51] Int. Cl.⁵ .................. F02C 3/08; F04D 29/42
[52] U.S. Cl. ................... 60/726; 415/58.3; 415/143
[58] Field of Search ............... 60/726; 415/52.1, 58.2, 415/58.3, 58.4, 143, 206

[56] References Cited

U.S. PATENT DOCUMENTS

| | | | |
|---|---|---|---|
| 3,504,986 | 4/1970 | Jackson | 415/143 |
| 3,741,677 | 6/1973 | Silvern et al. | 415/58.4 |
| 4,375,937 | 3/1983 | Cooper | 415/58.4 |
| 4,375,938 | 3/1983 | Dussourd | 415/58.4 |
| 4,642,023 | 2/1987 | Dunn | 415/143 |
| 4,743,161 | 5/1988 | Fisher et al. | 415/58.3 |

Primary Examiner—Louis J. Casaregola
Attorney, Agent, or Firm—Wood, Phillips, Mason, Recktenwald & Vansanten

[57] ABSTRACT

A narrow efficient operating island for a centrifugal compressor may be increased in a construction including a compressor section 18 mounting blades 22 surrounded by an annular shroud 38 by placing bleed passages 88 in the shroud 38 and angling them in the direction of flow, both axially (FIG. 1) and radially (FIG. 3).

13 Claims, 2 Drawing Sheets

COMPRESSOR SHROUD AIR BLEED PASSAGES

FIELD OF THE INVENTION

This invention relates to rotary machines used as compressors, and more particularly, to an axial inflow, radial outflow rotary compressor.

BACKGROUND OF THE INVENTION

Flow ranges for centrifugal compressors generally and the ranges over which they may operate specifically are dictated by the stalling characteristics of the compressor impeller and the diffuser which receives the compressed air from the impeller. The stalling characteristics in turn are intrinsically controlled by the contours of the blades as well as the Mach numbers achieved during operation.

Although various centrifugal compressors may utilize either vaned or vaneless diffuser systems, where maximum efficiency at high Mach numbers is required, the use of vaned diffuser systems becomes almost mandatory; and this in turn means that the impeller and diffuser must be matched at peak efficiency flow conditions.

In such cases, the vaned diffuser tends to be the flow controlling component in that the overall Mach number occurring therein generally is higher than that of the compressor inducer, which operates with a larger variation of Mach numbers over the radius of the blades extending from the hub to the compressor shroud in an axial inflow, radial outflow centrifugal compressor. The diffuser additionally must accept an already diffused flow from the impeller in such a case and the non uniform entrance conditions which result further aggravate stalling sensitivity. To attain a large flow range requires that the impeller and the diffuser must be capable of operating into "positive incidence" or stalled regions to flows where compressor surge is eventually triggered. Compressor surge is generally believed to stem from operation on an unstable portion of the overall compressor characteristic (a positive slope portion) where the impeller static pressure ratio decreases with decreasing flow. Thus, one effective method of increasing compressor operating range is to provide sufficient impeller stability so that the downstream diffuser can operate well into its positive incidence zone, even though the diffuser static pressure recovery versus flow characteristic exhibits a positive slope. Impeller stability is conventionally provided by the use of blade tip backsweep since the increased backsweep provides a more negatively sloped static pressure rise versus flow characteristic. However, increasing the tip backsweep increases stresses appearing in the impeller blade and/or hub.

Present day advanced aircraft require auxiliary power units (APU's) as a supply of electrical, hydraulic and pneumatic power to secondary power systems of the aircraft. Generally speaking, the APU's are gas turbine units and must be highly reliable. In addition, compactness is also required. Most suitably, the APU's are then based upon a single shaft, constant speed, gas turbine having a high specific speed, single stage centrifugal compressor, a reverse flow annular combustor, and a single stage radial or axial inflow turbine. Shaft power is utilized to drive electrical generators and/or pumps and compressor bleed air extracted from the system prior to combustion to provide pneumatic power. For high bleed air output, it is necessary to design the compressor to operate adjacent to its maximum flow point, that is, near a so called "choke" condition. The extraction of increasing amounts of shaft power at constant speed and constant turbine inlet temperatures from the choke point incrementally displaces the compressor operating point to lower flows and is eventually limited by encroachment upon the compressor surge line.

The present invention is directed to overcoming one or more of the above problems.

SUMMARY OF THE INVENTION

It is the principal object of the invention to provide a new and improved rotary compressor. More specifically, it is an object of the invention to provide such a compressor that may operate efficiently over wider ranges then those heretofore known and yet retains the reliability of prior systems and is therefore ideally suited for use as part of an APU.

An exemplary embodiment of the invention achieves the foregoing object in a structure including a rotor hub along with means journaling the rotor hub for rotation about an axis. A plurality of blades are located on the rotor hub with each extending in a curve from a radially inner first location to a radially outer second location axially spaced from the first location to define an axial inflow, radial outflow compressor rotor. The blades have free peripheral edges, an inducer section having a throat and an impeller section downstream of the inducer section. An annular shroud is disposed about the rotor and has opposed ends and an inner surface just slightly spaced from the peripheral edges of the blades. The shroud has an inlet opening at the end thereof nearest the first location and an opposite outlet opening at the other end thereof and nearest the second location. A series of bleed passages are disposed in the shroud and extend from the inner surface and are in fluid communication with the inlet opening via passages that are located radially outward of the inner surface. The passages are directed generally toward the second location from the inner surface of the shroud and emerge at the inner surface at or axially downstream of a plane transverse to the axis of rotation and intersecting the inducer section.

In a preferred embodiment, the passages further extend axially outward from the inner surface in the intended direction of rotation of the rotor.

In a highly preferred embodiment, the plane intersects the throat of the inducer.

The invention contemplates that the shroud have an outer surface opposite the inner surface and that the passages extend from the inner surface to the outer surface with the path being radially outward of the outer surface.

In a highly preferred embodiment, a baffle is located adjacent to the outer surface and about the passages for directing fluid from the passages back toward the inlet. Preferably the baffle is provided with deswirl vanes so that the returning fluid approaches the inlet with essentially no swirls.

The invention contemplates that the ratio of the blade outer radius at the first location to the blade outer radius at the second location be at least about 0.6 but less than 1.0.

The invention also contemplates an air breathing turbine including a rotary machine as described above and further including a diffuser adjacent to the outlet, a turbine wheel coupled to the rotor, a nozzle about the turbine wheel for directing hot gases of combustion thereat to drive the same, and a combustor disposed between the diffuser and the nozzle for receiving compressed air from the diffuser and delivering the same to the combustor to support the combustion of fuel and air and to generate the gases of combustion.

In a highly preferred embodiment of the invention, the turbine wheel is adapted to drive the rotor at a specific speed of about 100 or more where a specific speed equals:

$$\frac{\text{Rotor RPM } \sqrt{\text{Volume Flow}}}{(H_{ad})^{0.75}}$$

where volume flow is in cubic feet per second and $H_{ad}$ is the adiabatic head.

Other objects and advantages will become apparent from the following specification taken in connection with the accompanied drawings.

DESCRIPTION OF THE PREFERRED EMBODIMENT

Figure 1:
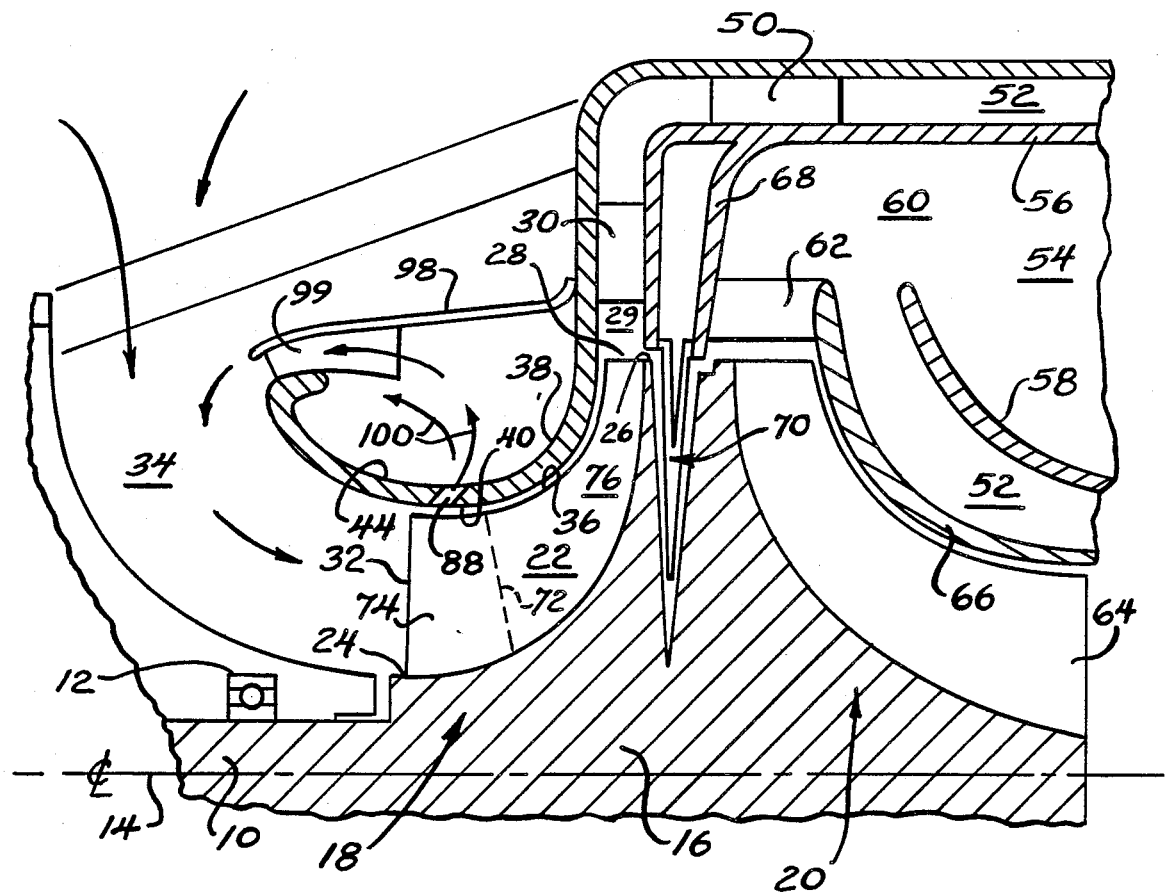
FIG. 1 is a fragmentary sectional view of an air breathing turbine made according to the invention.

An exemplary embodiment of a centrifugal compressor made according to the invention is illustrated in the drawings in the context of the compressor stage for an air breathing turbine engine. However, it should be recognized that the centrifugal compressor may find utility in other environments as well and restriction to use as part of an air breathing turbine is not intended except insofar as specified in the claims.

Referring to FIG. 1, the invention includes a shaft 10 journaled for rotation by bearings 12 about an axis 14. Mounted on or integral with the shaft 10 is a hub 16 which includes a centrifugal compressor section, generally designated 18, and a turbine wheel section, generally designated 20, coupled to the turbine wheel section 18.

A series of compressor blades 22 extend in a curved fashion from a first location 24 on the hub 16 to a second location 26 thereon. The locations 24 and 26 are axially spaced with the location 26 being radially outward of the location 24.

Those skilled in the art will realize that the ends 28 of the blades 22 at the location 26 are tips which discharge compressed air through an outlet 29 into a vaned diffuser 30 of conventional construction. At the location 24, the ends 32 of the blades 22 face an inlet area 34. Each of the blades also has a curved, radially outer surface or free edge 36 which is in close proximity to a shroud 38. The shroud 38 in turn has an inner surface 40 closely adjacent to surfaces 36 of the blades 22 and an opposite outer surface 44.

In series with the diffuser 30 is a deswirler or axial diffuser 50 which conveys compressed air to a plenum 52 which extends generally about an annular combustor 54 having radially outer and inner walls 56 and 58 respectively. An outlet 60 from the combustor 54 extends to an annular nozzle 62 located about the turbine wheel section 20. The turbine wheel section includes a plurality of turbine vanes or blades 64 of conventional construction and a rear shroud 66 in proximity thereto.

A front shroud 68 is also provided along with a seal, somewhat schematically shown at 70, that seals the compressor section 18 of the rotor 16 from the turbine wheel section 20. At this point, it should be noted that while the rotor 16 appears in FIG. 1 somewhat schematically as a so-called "monorotor", such not need be the case. Indeed, the turbine wheel 20 need not even be on the same axis of rotation as the compressor section 18.

As seen in FIG. 1, a dotted line 72 indicates the division between the inducer section 74 of each of the blades 22 and the impeller section 76 thereof.

Figure 2:
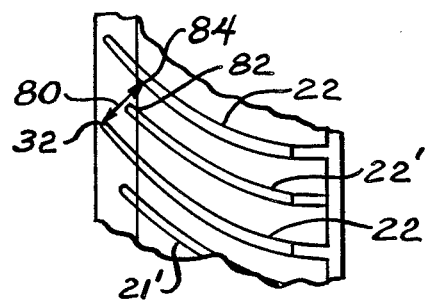
FIG. 2 is a fragmentary, developed view of the periphery of a rotor utilized in the invention.

As seen in FIG. 2, if desired, the blades 22 may alternate between full blades and splitter blades 22'. Alternatively, each of the blades 22 may be a full blade 22.

FIG. 2 also illustrates the determination of the whereabouts of the inducer throat. Starting at the beginning leading edge 32 of one of the full blades 22, the shortest distance from such end to the next adjacent full blade is determined and, in FIG. 2, is illustrated by a double headed arrow 80. A plane shown by line 82 transverse to the rotational axis 14 and parallel to the ends 32 while extending through a point 84 whereat the arrow 80 intersects such adjacent full blade 22 determines the throat line.

The blades 22, 22' and other compressor components including the vaned diffuser 30 are configured using known techniques to provide a high specific speed machine. In particular, a high specific speed machine according to the invention is one whose specific speed is at least about 100. Specific speed is defined as:

$$\frac{\text{Rotor RPM } \sqrt{\text{Volume Flow}}}{(H_{ad})^{0.75}}$$

and where volume flow is in cubic feet per second. $H_{ad}$ is the adiabatic head.

Additionally, the invention contemplates that the ratio of the distance from the center line or rotational axis 14 to the blade edges 36 at the first location defined by the point 24 to the radius at the second location defined by the point 26 be close to but less than 1.0 and at least 0.6. Overall Mach numbers are intended to be in excess of 1.

Figure 3:
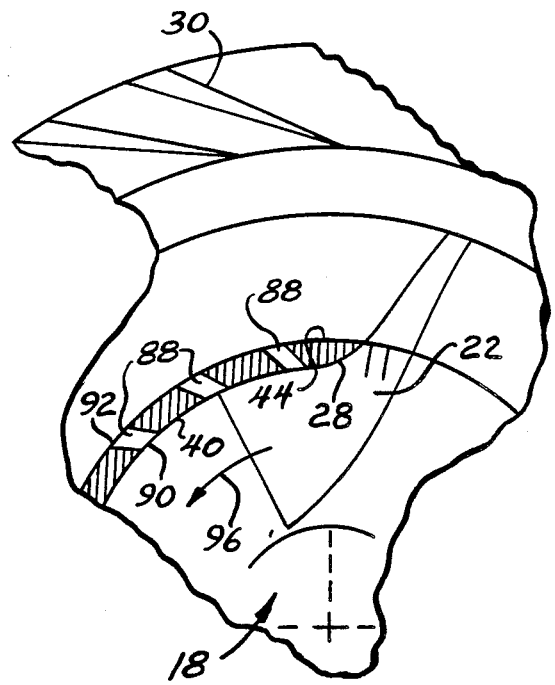
FIG. 3 is a fragmentary end view of the compressor section of the turbine.

According to the invention, to expand the area of efficient operation under the compressor curve a plurality of passages 88 are located in the shroud 38. As perhaps best seen in FIG. 3 the passages 88 have openings 90 on the inner surface 40 and openings 92 on the outer surface 44 of the shroud. As seen in FIG. 1 the passages 88 are axially angled in the downstream direction. That is to say, they extend from the inner surface 40 of the shroud 38 toward the second location defined by the point 26. As can be seen in FIG. 3, they are also angled in the direction of rotor rotation designated by an arrow 96. This angle is in the direction of rotor rotation from the inner surface 40 toward the outer surface 44.

An annular baffle 98 or the like is mounted on the shroud 38 in spaced relation to the outer surface 44 thereof. Gases entering the space between the outer surface 44 and the baffle 98 through the passages 88 as indicated by the arrows 100 are recirculated to the inlet 34 of the machine.

In a highly preferred embodiment, deswirl vanes 99 extend from the baffle 98 toward the outer surface 44. The vanes 99 essentially eliminate swirl from the recirculating gas before it reaches the inlet 34.

Figure 4:
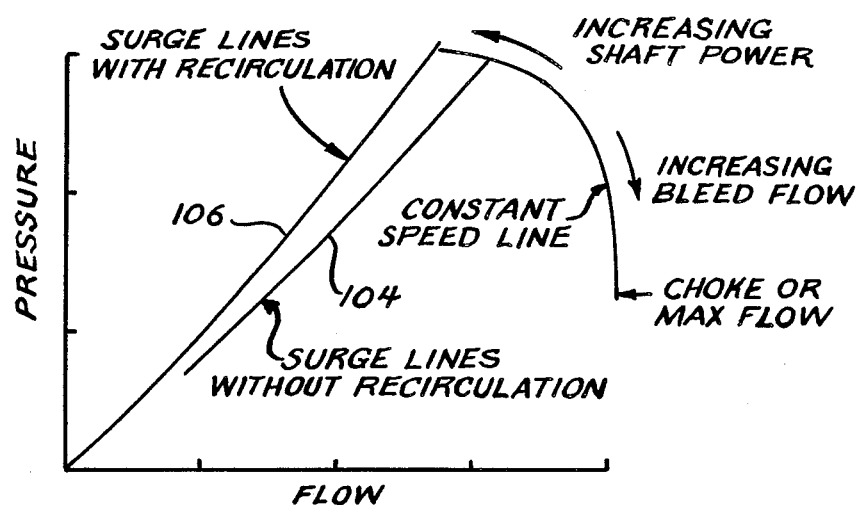
FIG. 4 is a plot of pressure versus flow for various operating characteristics of the compressor.

FIG. 4 illustrates the improvement in operating area that can be achieved when passages 88 made according to the invention are utilized. A surge line 104 illustrates operation of a machine without the passages 88 while another surge line 106 illustrates operation with the passages 88 and the recirculation achieved therewith.

According to the invention, it is believed to be desirable to make use of the Coanda Effect which is to say that the configuration disclosed results in the Coanda Effect causing the recirculating hot gases to attach to the surface 40 of the shroud 38. To optimize operation, the inner openings 90 to the passages 88 are located at or downstream of the plane 82 which of course intersects the inducer section 74 of the voids 22 and in fact is located at the throat line therefor. The angulation of the apertures, in addition, provides less resistance to the flow of bleed air through the passages 88 so that the lesser cross sectional area of the passages 88 can obtain the desired bleed rate. The particular location of the inner ends or openings 90 of the passages 88 minimizes stall problems. Slow flow that could result in stall problems is a maximum problem from the leading edge of the blades 22, that is, the ends 32 through the throat line designated by the plane 82 and if the flow becomes sufficiently slow, stall will result. By locating the passages 88 in the manner specified, and bleeding off air therethrough, the resistance to flow which results in the slowing of flow to the point where stall might occur is minimized to thereby minimize the stalling problem.

From the foregoing, it will be appreciated that a centrifugal compressor made according to the invention eliminates a number of the flexibility problems incurred with prior centrifugal compressors and is ideally suited for you in the environment of APU's wherein a turbine is run at constant speed but bleed flow and shaft power requirements vary.

We claim:

1. In a rotary machine, the combination of:
    a rotor hub;
    means journalling the rotor hub for rotation about an axis;
    a plurality of blades on the rotor hub each extending in a curve from a radially inner first location to a radially outer second location axially spaced from said first location to define an axial inflow, radial outflow compressor rotor with said rotor hub, said blades having free peripheral edges, an inducer section having a throat, and an impeller section downstream of said inducer section;
    an annular shroud about said rotor and having opposed ends and an inner surface just slightly spaced from said peripheral edges; said shroud having an inlet opening at the end thereof nearest said first location and an opposite outlet opening at the other end thereof and nearest said second location; and
    a series of bleed passages in said shroud extending from said inner surface and in fluid communication with said inlet opening via a path radially outward of said inner surface, said passages being directed generally toward said second location from said inner surface and emerging at said inner surface at or axially downstream of a plane transverse to said axis and intersecting said inducer section.

2. The rotary machine of claim 1 wherein said passages further extend outward from said inner surface in the intended direction of rotation of said rotor.

3. The rotary machine of claim 1 wherein said plane intersects said throat.

4. The rotary machine of claim 1 wherein said shroud has an outer surface opposite said inner surface and said passages extend from said inner surface to said outer surface, said path being radially outward of said outer surface.

5. The rotary machine of claim 4 further including a baffle adjacent said outer surface and about said passages for directing fluid from said passages back toward said inlet.

6. The rotary machine of claim 1 further including deswirl vanes located between said bleed passages and said shroud inlet opening.

7. In a rotary machine, the combination of:
    a rotor hub;
    means journalling the rotor hub for rotation about an axis;
    a plurality of blades on the rotor hub each extending in a curve from a radially inner first location to a radially outer second location axially spaced from said first location to define an axial inflow, radial outflow compressor rotor with said rotor hub, said blades having free peripheral edges, an inducer section having a throat, and an impeller section downstream of said inducer section;
    an annular shroud about said rotor and having opposed ends and an inner surface just slightly spaced from said peripheral edges; said shroud having an inlet opening at the end thereof nearest said first location and an opposite outlet opening at the other end thereof and nearest said second location; and
    a series of bleed passages in said shroud extending from said inner surface and in fluid communication with said inlet opening via a path radially outward of said inner surface, said passages being directed generally toward said second location from said inner surface and emerging at said inner surface at or axially downstream of a plane transverse to said axis and intersecting said throat of said inducer sections, said passages further extending outward from said inner surface in the intended direction of rotation of said rotor.

8. In a rotary machine, the combination of:
    a rotor hub;
    means journalling the rotor hub for rotation about an axis;
    a plurality of blades on the rotor hub each extending in a curve from a radially inner first location to a radially outer second location axially spaced from said first location to define an axial inflow, radial outflow compressor rotor with said rotor hub, said blades having free peripheral edges, an inducer section having a throat, and an impeller section downstream of said inducer section;
    an annular shroud about said rotor and having opposed ends and an inner surface just slightly spaced from said peripheral edges; said shroud having an inlet opening at the end thereof nearest said first location and an opposite outlet opening at the other end thereof and nearest said second location; and
    a series of bleed passages in said shroud extending from said inner surface and in fluid communication with said inlet opening via a path radially outward of said inner surface, said passages being directed generally toward said second location from said inner surface and emerging at said inner surface at or axially downstream of a plane transverse to said axis and intersecting said inducer section, said passages further extending outward from said inner surface in the intended direction of rotation of said rotor.

9. The rotary machine of claim 8 wherein said plane intersects said throat.

10. In a rotary machine, the combination of:
a rotor hub;
means journalling the rotor hub for rotation about an axis;
a plurality of blades on the rotor hub each extending in a curve from a radially inner first location to a radially outer second location axially spaced from said first location to define an axial inflow, radial outflow compressor rotor with said rotor hub, said blades having free peripheral edges, an inducer section having a throat, and an impeller section downstream of said inducer section;
an annular shroud about said rotor and having opposed ends, an outer surface and an opposite inner surface just slightly spaced from said peripheral edges; said shroud having an inlet opening at the end thereof nearest said first location and an opposite outlet opening at the other end thereof and nearest said second location;
a series of bleed passages in said shroud extending from said inner surface to said outer surface; said passages being directed generally toward said second location from said inner surface and emerging at said inner surface at or axially downstream of a plane transverse to said axis and intersecting said throat of said inducer sections, said passages further extending toward said outer surface from said inner surface in the intended direction of rotation of said rotor; and
an annular baffle about said outer surface and encompassing said passages for directing fluid emanating therefrom toward said inlet openings; and deswirl vanes between said baffle and said outer surface.

11. An air breathing turbine including the rotary machine of claim 9, and further including:
a diffuser adjacent said outlet;
a turbine wheel coupled to said rotor;
a nozzle about said turbine wheel for directing hot gasses of combustion thereat to drive the same; and
a combustor disposed between said diffuser and said nozzle for receiving compressed air from said diffuser and delivering the same to said combustor to support the combustion of fuel therein to generate said gasses of combustion.

12. The air breather turbine of claim 10 wherein said turbine wheel is adapted to drive said rotor at specific speeds of about 100 or more where specific speed equals:

$$\frac{\text{Rotor RPM} \sqrt{\text{Volume Flow}}}{(H_{ad})\ 0.75}$$

and where volume flow is in cubic feet per second $H_{ad}$ is the adiabatic head.

13. The rotating machine of claim 10 wherein the ratio of the blade outer radius at said first location to the blade outer radius at said second location is at least about 0.6 but less than 1.0.

* * * * *